(12) United States Patent
Liu

(10) Patent No.: US 7,558,333 B2
(45) Date of Patent: Jul. 7, 2009

(54) DISTORTION TOLERANT LINEAR PHASE MODULATIONS

(76) Inventor: Qingchong Liu, 1333 Sandy Ridge Dr., Rochester Hills, MI (US) 48306

( * ) Notice: Subject to any disclaimer, the term of this patent is extended or adjusted under 35 U.S.C. 154(b) by 592 days.

(21) Appl. No.: 10/681,846

(22) Filed: Oct. 8, 2003

(65) Prior Publication Data
US 2005/0078767 A1  Apr. 14, 2005

(51) Int. Cl.
H04L 1/02 (2006.01)
H04L 27/00 (2006.01)
(52) U.S. Cl. ........................... 375/297; 375/259
(58) Field of Classification Search ............. 375/295, 375/296, 302, 308, 309, 312, 316, 322–326, 375/340, 341, 343, 346, 259, 260, 262, 265, 375/268, 269, 271, 279, 283; 455/91, 114.2, 455/114.3, 127.1, 127.2, 127.3, 127.5; 330/207 A, 330/207 R
See application file for complete search history.

(56) References Cited

U.S. PATENT DOCUMENTS

| 5,025,452 | A | * | 6/1991 | Sohner et al. ............... 375/130 |
| 5,638,404 | A | * | 6/1997 | Crozier ...................... 375/296 |
| 5,812,604 | A | | 9/1998 | Herbst et al. |
| 6,301,310 | B1 | | 10/2001 | Jackson et al. |
| 6,373,879 | B1 | * | 4/2002 | Park et al. ................... 375/140 |
| 6,470,055 | B1 | * | 10/2002 | Feher ........................ 375/259 |
| 7,103,111 | B2 | * | 9/2006 | Park .......................... 375/296 |
| 2003/0021357 | A1 | * | 1/2003 | Korol et al. ................. 375/295 |
| 2003/0156534 | A1 | * | 8/2003 | Coulson et al. ............. 370/210 |

OTHER PUBLICATIONS

Liu and Li, "Quasi-constant envelope OQPSK through nonlinear radio and AWGN channel," Proc. of IEEE MILCOM, Oct. 7-10, 2002, vol. 1, pp. 715-720, Anaheim, California.

* cited by examiner

*Primary Examiner*—Mohammad H Ghayour
*Assistant Examiner*—Vineeta S Panwalkar
(74) *Attorney, Agent, or Firm*—Reising Ethington P.C.

(57) ABSTRACT

A signal and information transmission system for communications or radar and a method of achieving distortionless transmission of linear phase shift keying signals amplified by nonlinear power amplifiers or distorted by up-converters and RF circuits or the channel. Error correcting codes are used to jointly overcome both the distortion by the power amplifiers or up-converters and RF circuits or the channel and the noise. The modulator generates properly pulse shaped PSK signal, which does not have constant envelope. The signal-to-distortion power ratio is maximized to be above 20 dB at the fully saturated power amplifier output. The simplest linear receiver is provided to demodulate the received signal in the presence of radio distortion, channel distortion and noise. The decoder makes decision in the presence of radio distortion, channel distortion and noise. The method guarantees distortionless transmission of PSK signals for communications systems or radar employing power amplifiers of high DC-to-AC power conversion efficiency including class-F, class-E, class-D, class-C, or any of class-A, class-B, class-AB working in the saturation region. The method can achieve high bandwidth efficiency.

25 Claims, 9 Drawing Sheets

DISTORTION TOLERANT LINEAR PHASE MODULATIONS

BACKGROUND OF THE INVENTION

1. Field of the Invention

The present invention relates to generating a linearly modulated signal using phase shift keying, which can tolerate distortion in transmission, and achieving optimal or near optimal demodulation performance in the presence of distortion. The distortion can be caused by RF circuits including high power amplifiers and up-converters and mixers at radio frequency or by the channel. The invention may have applications in communications systems using phase shift keying, wireless communications, satellite communications, radar, and in particular in a communication terminal or radar which needs enough transmission power, or high DC-to-AC power conversion efficiency, or simple design for transmitter or receiver, or simple radio frequency circuit design.

2. Background and Description of Related Art

In recent years the data rate demanded for wireless communications has increased dramatically. Commercial products supporting 1 Gbps are already in service using millimeter wave and BPSK in ultra-broadband wireless communications in the last-mile. The data rate in wireless LAN is also increased significantly. The ultra-wideband (UWB) technology is under intense study for commercial applications or radar systems. It is desirable to create low complexity transceivers to support very high data rates or chip rates. The transmitter must have enough transmission power. For mobile terminals and transceivers operated on battery such as in wireless sensor networks, it is preferred to have high DC-to-AC power conversion efficiency. The high DC-to-AC power conversion efficiency can be achieved using the class-C, class-D, class-E or class-F power amplifiers. These power amplifiers cause non-negligible distortion to linear phase modulations and are traditionally not used in systems which employ non-constant envelope phase modulations such as phase shift keying. The transmitter or the receiver needs simple implementation including simple RF circuit to minimize the cost. The system needs high bandwidth efficiency and optimal or near optimal demodulation performance.

Constant envelope modulation methods have been widely used to tolerate distortion. This was achieved by keeping the envelope of the modulated signal as constant and embedding the information in the phase or the frequency of the modulated signal. A popular subset of constant envelope modulations is known as continuous phase modulation. The complexity in either the transmitter or the receiver is usually not low for constant envelope modulations. An equalizer is needed in the receiver to achieve optimal or near optimal demodulation performance. Because of the complexity, constant envelope modulations are not preferred when data rate or chip rate is high.

Herbst et. al. (as represented by U.S. Pat. No. 5,812,604) have invented a method to form constant envelope OQPSK signal using hard-limiting. The constant envelope OQPSK signal is easier to be up-converted to radio frequency.

Inspired by the results in the constant envelope OQPSK, which was independently obtained in 1996 by the inventor of this application, Jackson and Roos invented the implementation of the constant envelope OQPSK using MSK modulator. The implementation is represented by U.S. Pat. No. 6,301,310, which cannot give good power spectral density and causes large degradation in signal-to-noise power ratio for bit error performance.

In summary, previous methods have practiced generating constant envelope. They followed the traditional theory and practice that constant envelope signals can tolerate radio distortion.

SUMMARY OF THE INVENTION

This invention provides a novel method and system for signal and information, transmission which can overcome the distortion caused by RF circuits including power amplifiers and up-converters and mixers or by communication channels. Such power amplifiers can be in the class-C, class-D, class-E, class-F, or any of class-A and class-B and class-AB working in the saturation region. The invented method generates phase modulated signals in baseband and maximizes the signal-to-distortion power ratio at the output of the power amplifier or at the channel output. The maximization of the signal-to-distortion power ratio can be achieved using optimal filtering in base band. The invented filtering can be implemented using linear filter of finite impulse response or nonlinear filter. In the receiver, the invention uses a filter or filters matched to the base band filter or filters in the transmitter, which has the option to include the base-band equivalent model of the power amplifier or of the channel. The invention employs channel coding to overcome both the AWGN and the distortion caused by RF circuits such as power amplifiers and up-converters and mixers in the transmitter or by the channel. The implementation of the invention can have the simplest architecture for either the transmitter or the receiver. The invention can achieve high bandwidth efficiency. The invented method does not require linearity in the power amplifier or in the channel. The invention can achieve optimum or near optimum bit error performance. The invented method can significantly reduce the cost of communications terminals and increase the battery life by employing partially or fully saturated power amplifiers or power amplifiers of high DC-to-AC power conversion efficiency.

DETAILED DESCRIPTION OF THE INVENTION

Figure 1:
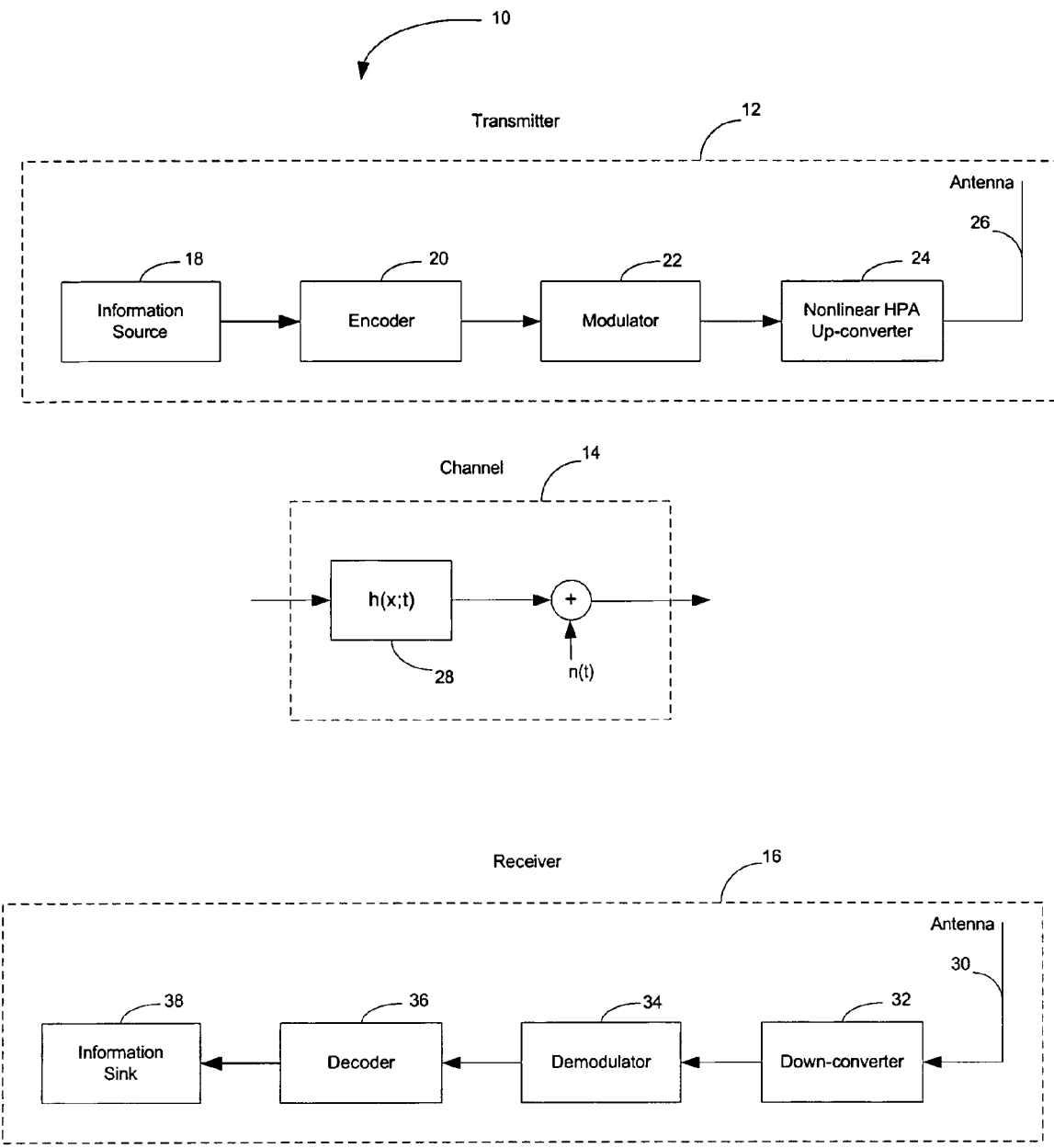
FIG. 1 is a block diagram of a wireless communications system in accordance with the invention.

Referring to FIG. 1, a wireless communications system 10 in accordance with one embodiment of the present invention is illustrated. The system 10 includes a transmitter 12, a channel 14 and a receiver 16. The transmitter is in communication with the receiver in radio frequency (RF) through the channel.

The transmitter 12 has an information source 18, an encoder 20, a modulator 22, a high-power amplifier (HPA) with up-converter 24 and an antenna 26. The encoder performs encoding, which not only takes care of the additive noise in the channel but also overcomes the distortion. The distortion can be caused by either the high power amplifier and the up-converter with mixer 24 or the channel 14. The modulator 22 generates a modulated signal using phase shift keying. When the modulated signal is amplified and up-converted, the distortion at the output of the high power amplifier and up-converter 24 is minimized. The output signal of the high power amplifier and up-converter is fed into the antenna 26 and then transmitted at radio frequency. The modulated signal is transmitted through the channel 14.

The channel 14 can be a linear channel or a nonlinear channel. The channel adds noise to the signal. The channel can also cause distortion to the signal.

The receiver 16 includes an antenna 30, a down-converter 32, a demodulator 34, a decoder 36 and an information sink 38. The antenna receives the radio frequency signal with noise and distortion. The down-converter removes the carrier and gives the baseband signal with noise as the output. The demodulator performs packet detection, synchronization and filtering or correlation and recovers the signal in the presence of noise and distortion. The decoder makes decision for the information bits. The decoded bits are passed to the information sink.

The high power amplifier 24 or the channel 14 can cause severe distortion to the signal. For example, the power amplifier can be any of class-C, class-D, class-E and class-F. The power amplifier can be fully saturated and can completely remove the amplitude variation. In the traditional PSK modulations the amplitude variation is essential and the power amplifier is required to have good linearity for distortionless transmission. Consequently, traditional communications systems using PSK are well known for not being able to employ power amplifiers working in moderately or deeply saturated region. However, saturated power amplifiers can achieve much higher DC-to-AC power conversion efficiency. The high DC-to-AC power conversion efficiency is ideal in mobile communications, ultra-broadband wireless and satellite communications, and sensor networks.

The encoder 20 adds redundancy to the information sequence. The redundancy can help to overcome both the noise and the distortion introduced by either the power amplifier and RF circuits or the channel. The encoding methods are preferred to be, but not limited to, the following: (a) Turbo codes; (b) Convolutional codes; (c) Block codes; (d) Low density parity check codes.

Figure 2:
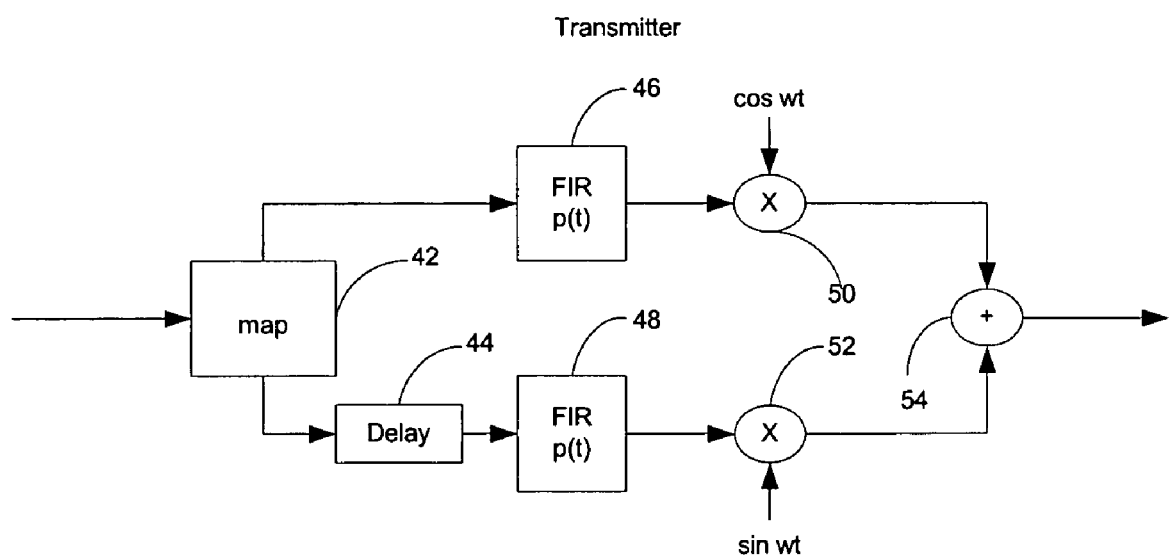
FIG. 2 is a block diagram of the modulator for the invention.

The modulator 22 converts the discrete-time sequence at the encoder output to a continuous time waveform. The structure of the modulator is shown in FIG. 2. The map circuit 42 takes $k=\log_2 M$ bits at a time and maps these bits into the phase value using the Gray coding scheme. The phase value is applied to both the inphase channel signal and the quadrature channel. The quadrature channel signal can be delayed by half a symbol time by the delay module 44 when OQPSK is employed. Finite impulse response (FIR) filters 46 and 48 are employed in both channels for pulse shaping. The pulse shaping is to increase the spectral efficiency at the high power amplifier output even in the presence of strong distortion caused by the high power amplifier.

The coefficients of the FIR must be so carefully chosen that after the modulated waveform is amplified by the power amplifier, the distortion measured at the power amplifier output is minimized. There are many shaping functions which can satisfy this requirement. We recommend the square root raised cosine function with the duration as $L \in [2,6]$ symbols and the roll-off factor $\beta \in [0.9, 1.0]$. Window functions in signal processing by Hanning, Hamming and Blackman can also be used as the shaping pulse. Let the pulse shaping function be p(t). Let the impulse response function of the high power amplifier be $p_1(t)$. If $p_1(t)$ is unknown to the designer, the shaping pulse p(t) should be chosen so that the Nyquist criterion can be satisfied, i.e., $$x(t = kT_s) = \begin{cases} 1 & \text{If } k = L; \\ 0 & \text{Else} \end{cases} \quad (1)$$

where x(t) is the convolution of p(t) and $p(LT_s-t)$. If $p_1(t)$ is known to the designer, the Nyquist criterion should be satisfied with x(t) as the convolution of $g(t)=p(t)*p_1(t)$ and $g(T-t)$, where T is the duration of g(t).

The inphase signal is multiplied by the module 50 for the IF carrier $\cos(\omega t)$. The quadrature signal is multiplied by the module 52 for the IF carrier $\sin(\omega t)$. The signals in the inphase channel and the quadrature channel are added together by the module 54, and fed into the high power amplifier 24. The input signal to the high power amplifier 24 can be written as $$s(t) = \sum_k p(t - kT_s) \cos(\phi_k) \cos(2\pi f t) - \sum_k p(t - kT_s - \tau) \sin(\phi_k) \sin(2\pi f t) \quad (2)$$

where $\{\phi_k\}$ is the phase sequence obtained using the Gray encoding.

The power amplifier amplifies the signal to the desired power level and performs the up-conversion of the signal to the carrier frequency. The power amplifiers can be in the class-C, class-D, class-E or class-F. The power amplifier can also be any of the class-A, class-B, or class-AB working in the saturation region to gain high DC-to-AC power conversion efficiency.

Table 1 lists the signal-to-distortion power ratio measured at the fully saturated power amplifier output. The input to the fully saturated power amplifier is the modulated signal using the modulator in FIG. 2 for OQPSK. The square root raised cosine function with the roll-off factor $\beta$, among many good functions, serves as the pulse shaping function. It can be seen that the distortion to the signal at the fully saturated power amplifier output is minimized to be negligible. The distortion can be minimized to be negligible for the system in FIG. 1 employing the modulator in FIG. 2 using M-ary PSK, including BPSK, QPSK, OQPSK, π/4 QPSK, 8-PSK and 16-PSK.

Figure 3:
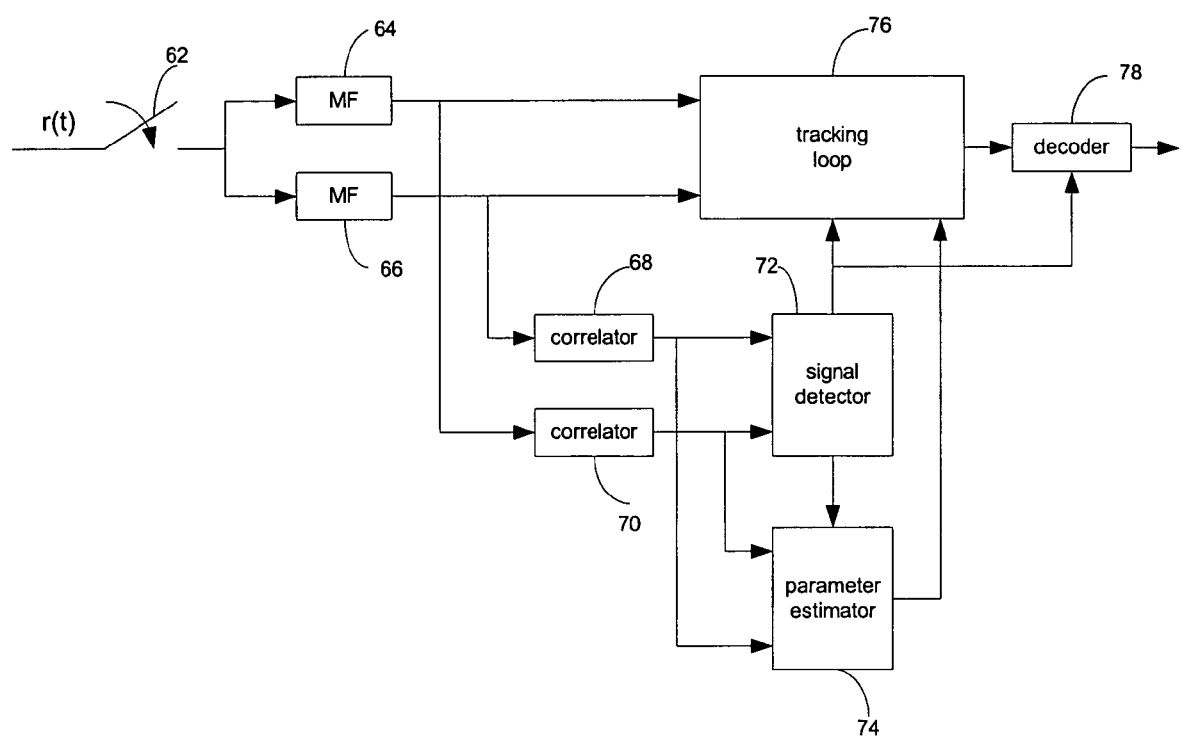
FIG. 3 is a block diagram of the demodulator for the invention.

The structure of the demodulator is shown in FIG. 3. The down-converter output is sampled by the module 62 at $f_s \geq 4R_s$ samples per second, where $R_s$ is the symbol rate. The signal in the in-phase channel is filtered by the filter 64, which is matched to the pulse shaping filter if the impulse response of the power amplifier is unknown, or matched to the convolution of the pulse shaping function and the impulse response of the power amplifier. The signal in the quadrature channel is filtered by the filter 66, which is also matched to the pulse shaping filter if the impulse response of the power amplifier is unknown, or matched to the convolution of the pulse shaping function and the impulse response of the power amplifier. The correlator 68 and the correlator 70 correlate the received signal with the preamble in each packet for packet detection and parameter estimation. The packet detector 72 detects each packet. The parameter estimator 74 estimates the symbol time, the carrier phase and the frequency offset. The tracking loop 76 is initialized using the symbol time estimate, the carrier phase estimate and the frequency offset estimate. At the tracking loop output, the errors are minimized for symbol time, carrier phase and frequency offset.

TABLE 1

Signal-to-distortion power ratio of OQPSK signal amplified by fully saturated power amplifier. The shaping pulse is the square root raised cosine function with the roll-off factor β and the duration of L symbols.

| β     | 1.0   | 0.9   | 0.8   | 0.7   | 0.6   | 0.5   | 0.4   | 0.3   |
|-------|-------|-------|-------|-------|-------|-------|-------|-------|
| L = 8 | 21.38 | 19.86 | 18.43 | 17.11 | 15.92 | 14.84 | 13.88 | 13.03 |
| L = 6 | 21.33 | 19.81 | 18.37 | 17.06 | 15.89 | 14.83 | 13.87 | 13.05 |
| L = 4 | 21.34 | 19.84 | 18.40 | 17.06 | 15.85 | 14.80 | 13.90 | 13.17 |

The demodulator output is fed into the decoder 78. The decoder can be an iterative decoder for the turbo code, or the Viterbi decoder for the convolutional code, or the decoder for the low density parity check code, or the decoder for the block code.

Figure 4:
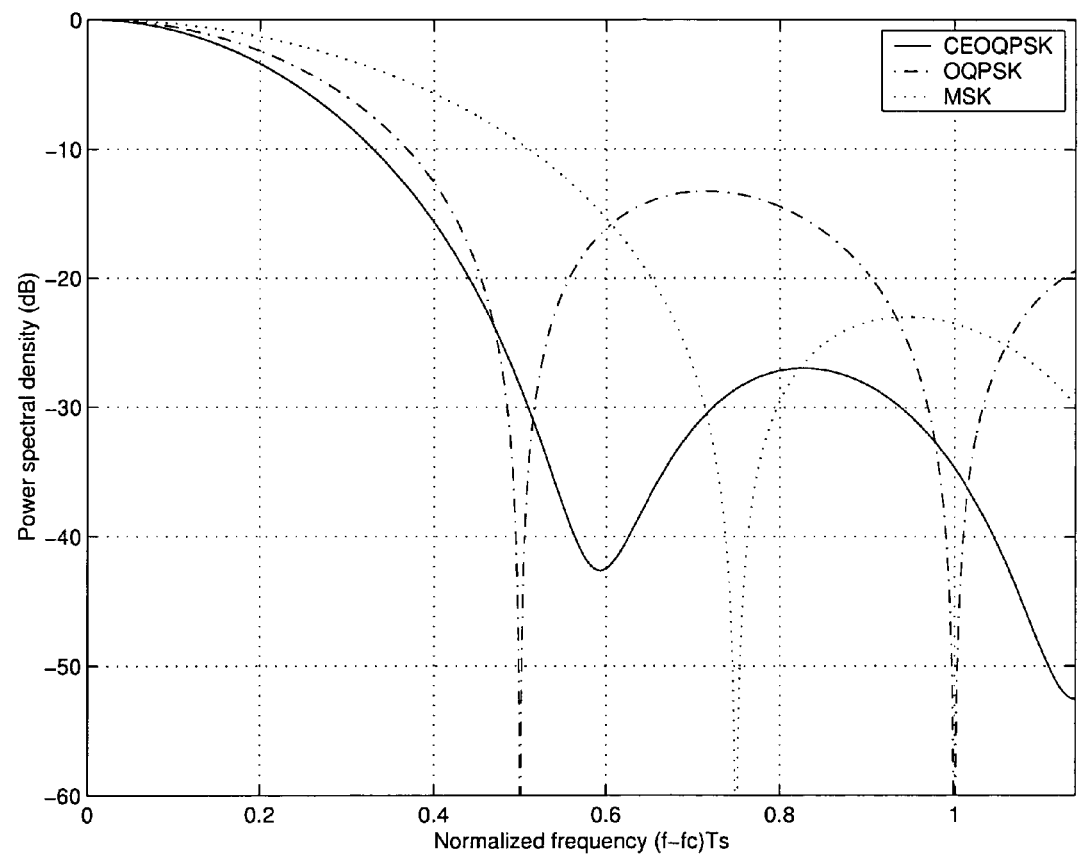
FIG. 4 is the power spectrum density for OQPSK using the invention with fully saturated power amplifier without filtering at the amplifier output to limit the out-of-band emission.

FIG. 4 shows the power spectrum density in the solid line for a communications system or radar system employing the present invention with a fully saturated power amplifier. There is no band-limiting filter either in the power amplifier or after it in obtaining the power spectrum density. It can be seen that the sidelobe is below −26 dB. The sidelobe can be reduced by adding a band-limiting filter at the power amplifier output, when out of band emission needs further reduction of the sidelobe. For comparison, the power spectrum densities are also plotted in the dash-dot line for the traditional OQPSK using the square shaping pulse and a linear power amplifier, and in the dot line for MSK.

Figure 5:
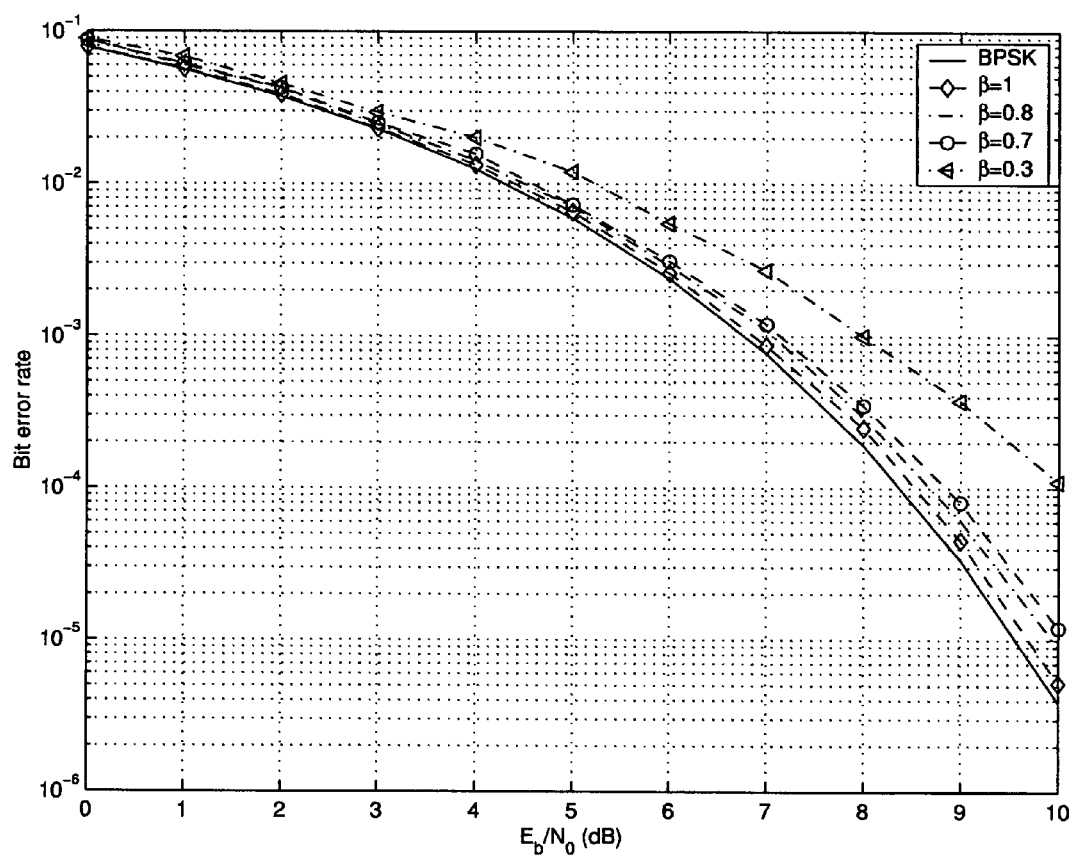
FIG. 5 is the bit error rate for OQPSK with hard decision employing the present invention.

FIG. 5 shows the uncoded bit error rate for the communications system in FIG. 1. The modulation scheme is the OQPSK and the high power amplifier is fully saturated, which can be the class-C, class-D, class-E or class F power amplifiers, or any of the class-A, class-B, class-AB power amplifiers working in the saturated region. It can be seen that at BER=$10^{-5}$, our method minimizes the SNR degradation introduced by the fully saturated power amplifier to 0.1 dB. When the square root raised cosine function is employed as the pulse shaping function, the roll off factor is preferred to be close to 1.

Figure 6:
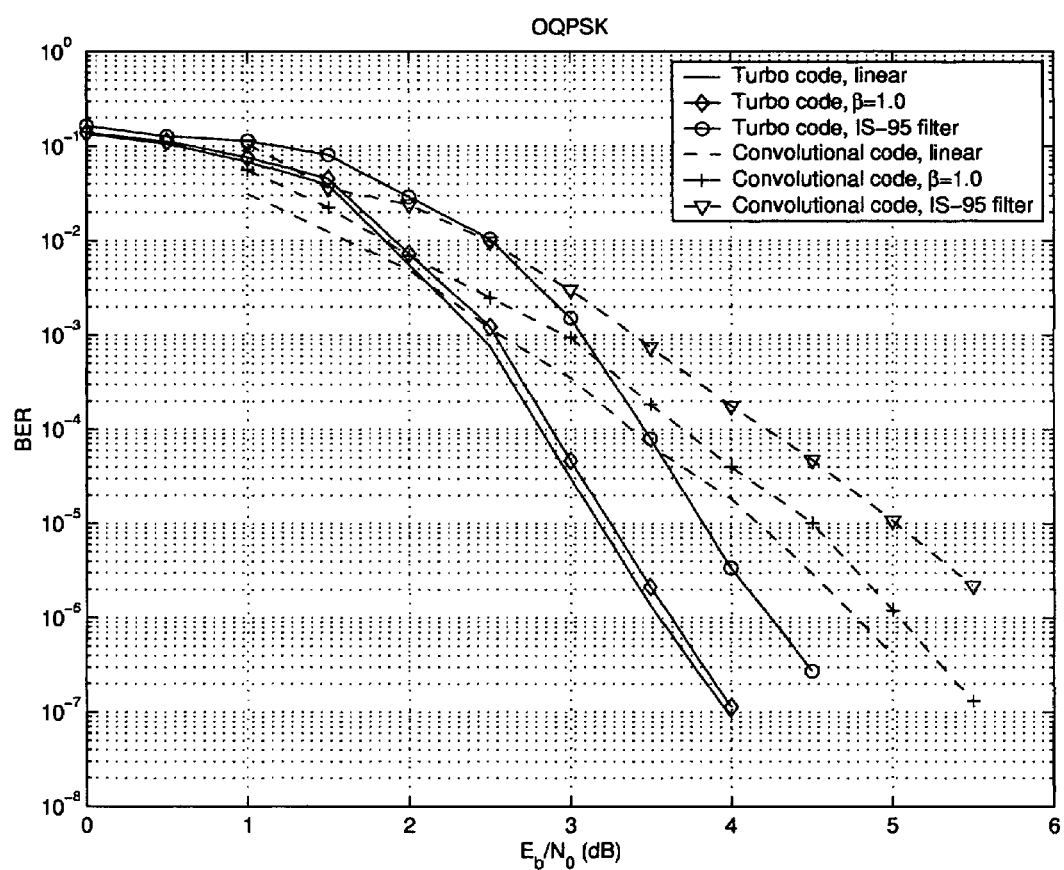
FIG. 6 is the bit error rate for OQPSK with convolutional code or turbo code employing the present invention.

FIG. 6 shows the coded bit error rate for the communications system in FIG. 1 employing OQPSK and convolutional code or turbo code. The power amplifier is fully saturated. For comparison, the dash line and the solid line show the performance for the ideal linear power amplifier. The rate is ½ and the constraint length is K=7 for the convolutional code. The Viterbi decoder is employed. The performance is better when the constraint length increases. The rate is ½ and the constraint length is K=4 for the turbo code. Three iterations are employed in the decoder. It can be seen that the degradation of the signal-to-noise power ratio caused by the fully saturated power amplifiers is negligible when the square root raised cosine filter is employed. The turbo code outperforms the convolutional code. When the pulse shaping filter in the IS-95 is employed, the fully saturated power amplifier causes the SNR to degrade by 0.5 dB at BER=$10^{-5}$ for the convolutional coded system, or by 0.7 dB at BER=$10^{-6}$ for the turbo coded system.

Figure 7:
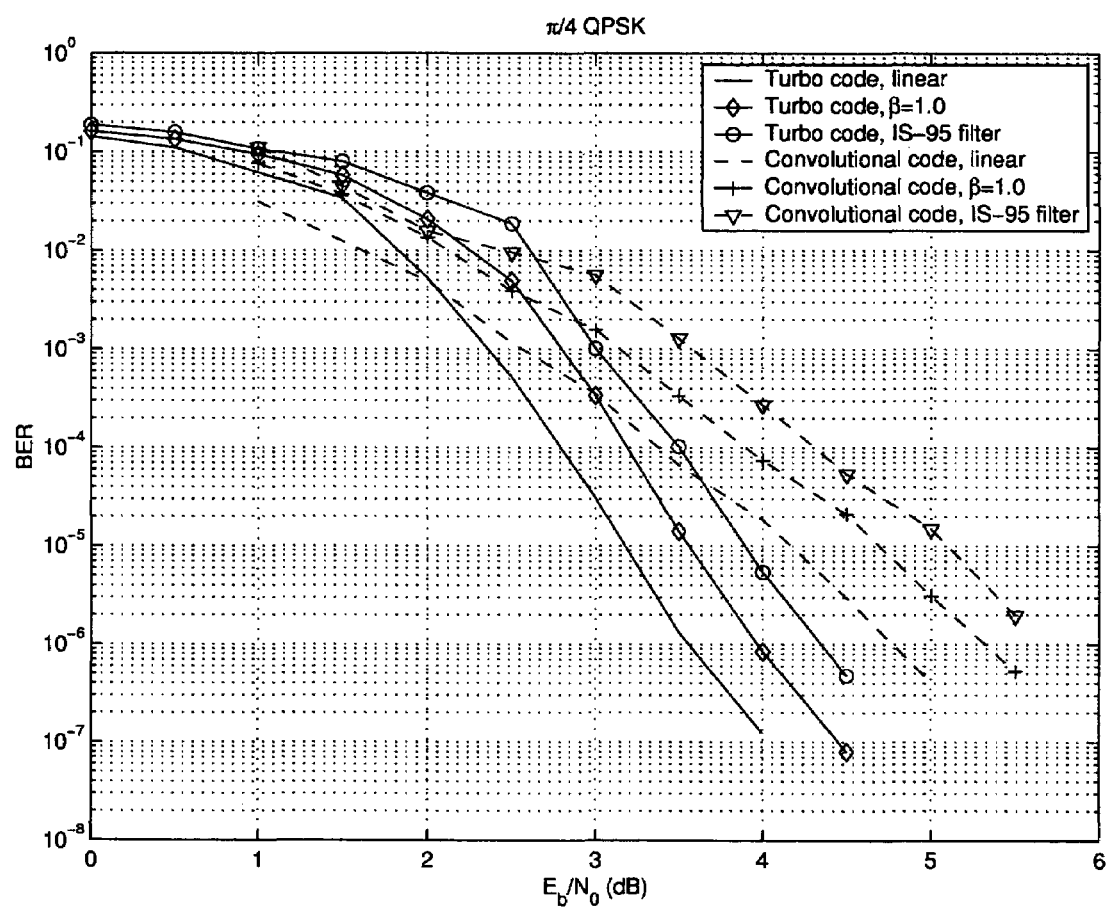
FIG. 7 is the bit error rate for $\frac{\pi}{4}$ QPSK employing the present invention with convolutional code or turbo code.

FIG. 7 is the bit error rate for $$\frac{\pi}{4}$$

QPSK employing the present invention with convolutional code or turbo code. The rate is ½ and the constraint length is K=7 for the convolutional code. The Viterbi decoder is employed. The performance is better when the constraint length increases. The rate is ½ and the constraint length is K=4 for the turbo code. Three iterations are employed in the decoder. It can be seen that the degradation of the signal-to-noise power ratio caused by the fully saturated power amplifiers is negligible.

Figure 8:
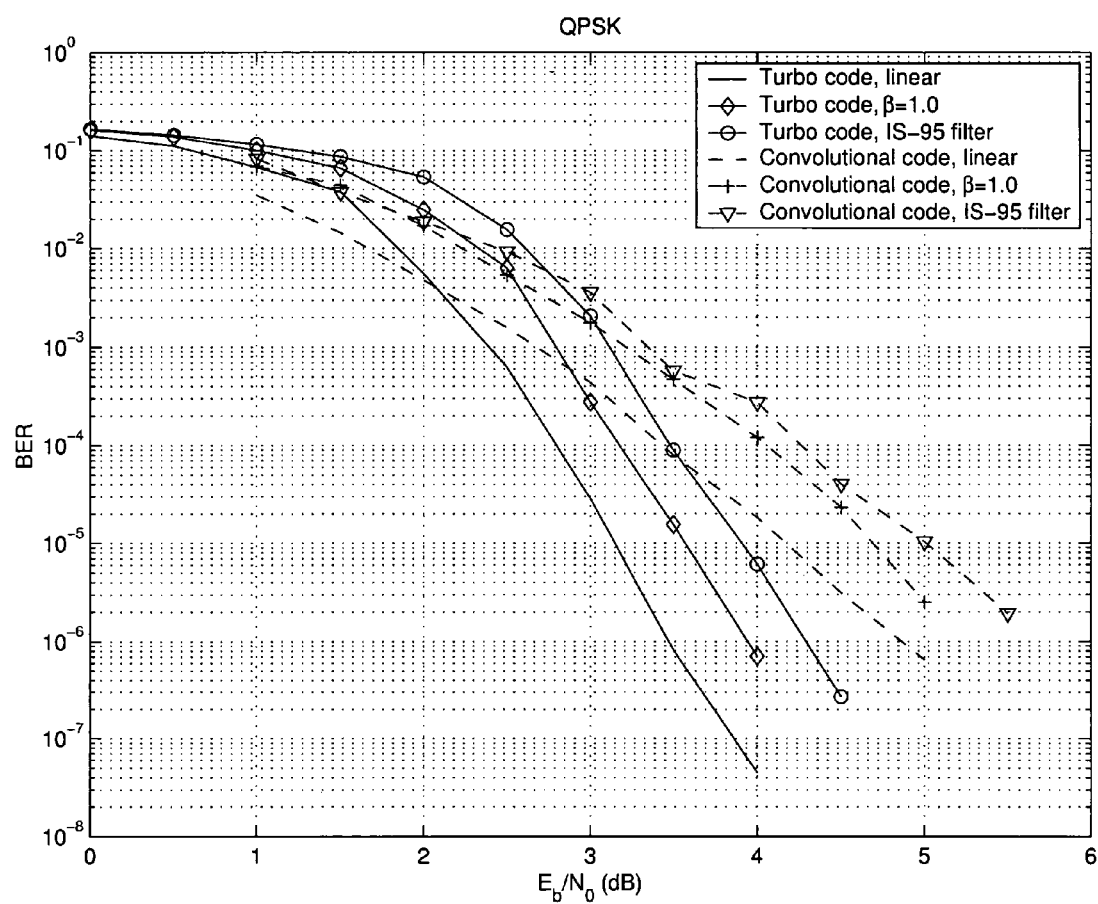
FIG. 8 is the bit error rate for QPSK employing the present invention with convolutional code or turbo code.

FIG. 8 is the bit error rate for QPSK employing the present invention with convolutional code or turbo code. The rate is ½ and the constraint length is K=7 for the convolutional code. The Viterbi decoder is employed. The performance is better when the constraint length increases. The rate is ½ and the constraint length is K=4 for the turbo code. Three iterations are employed in the decoder.

Figure 9:
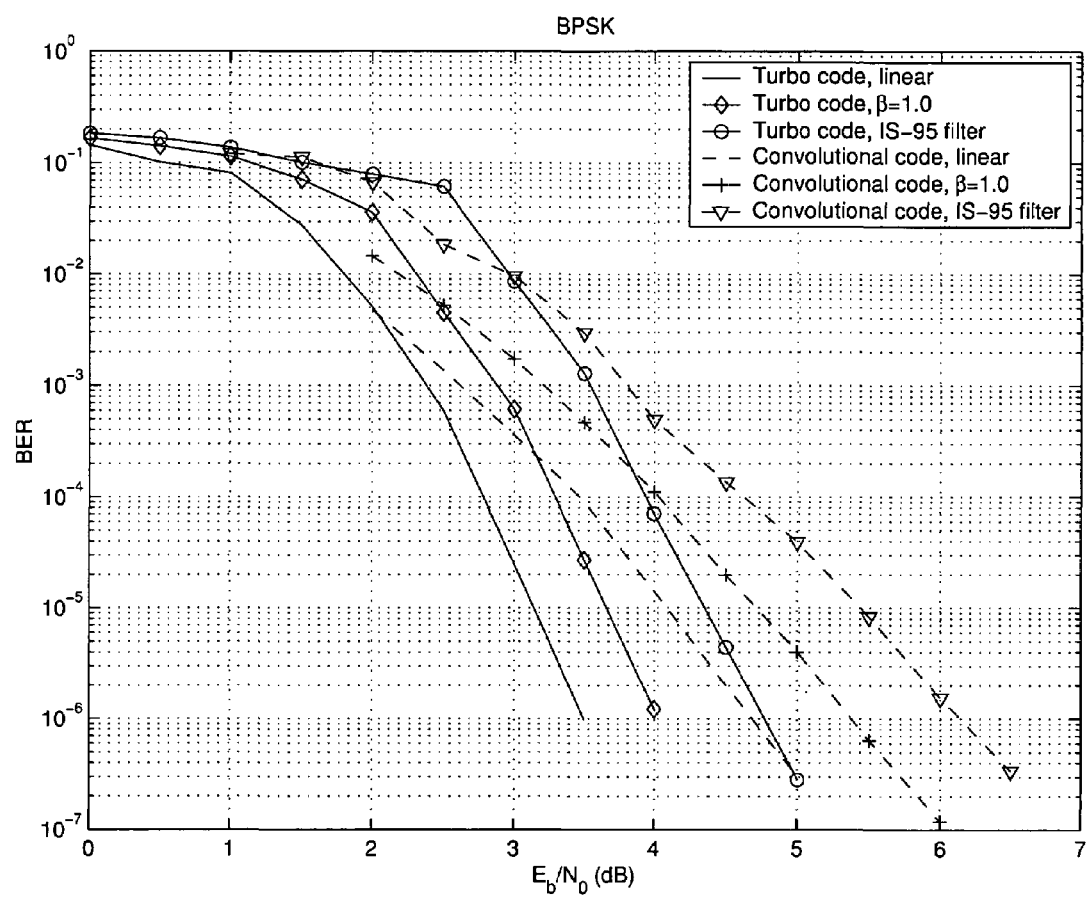
FIG. 9 is the bit error rate for BPSK employing the present invention with convolutional code or turbo code.

FIG. 9 is the bit error rate for BPSK employing the present invention with convolutional code or turbo code. The rate is ½ and the constraint length is K=7 for the convolutional code. The Viterbi decoder is employed. The performance is better when the constraint length increases. The rate is ½ and the constraint length is K=4 for the turbo code. Three iterations are employed in the decoder.

While there have been illustrated and described particular embodiments of the present invention, it will be appreciated that numerous changes and modifications will occur to engineers and scientists skilled in the art. The appended claims intend to cover all those changes and modifications which fall within the true spirit and scope of the present invention.

What is claimed is:

1. A method of minimizing the distortion caused by a saturated power amplifier or up-converter or RF circuit to phase modulated signals, the method comprising the steps of:
   mapping k bits d=$(d_1,d_2,\ldots,d_k)$ at a time to one of M=$2^k$ phases, the mapped phase is φ(d), which is a symbol;
   feeding a coefficient cos φ(d) to a first finite impulse response filter for summing a series of the delayed filter coefficients {p(j)} weighted by the symbol coefficients {cos φ(d)} to form a filtered in-phase signal; and
   feeding a coefficient sin φ(d) to a second finite impulse response filter for summing a series of the delayed filter coefficients {p(j)} weighted by the symbol coefficients {sin φ(d)} to form a filtered quadrature signal, wherein the filtering of the in-phase signal and the quadrature signal with a pulse shaping function p(t) of L≧2 symbols long, and the pulse shaping function satisfies:

$$x(t=kT_s) = \begin{cases} 1 & \text{If } k = L \\ 0 & \text{Else} \end{cases}$$

where x(t) is the convolution of p(t) and p(LT$_s$−t), T$_s$ is the symbol time; when the impulse response p$_1$(t) of the saturated power amplifier is known, the function x(t) is the convolution of g(t)=p(t)*p₁(t) and g(T−t), where T is the duration of g(t).

2. The method as recited in claim 1, including the step of using a function in a class including a square-root raised cosine function with the roll-off factor β in a range between 0.6 and 1.0, inclusive, a Hanning function, a Hamming function, and a Blackman function.

3. The method as recited in claim 2, wherein an envelope of the modulated signal varies.

4. The method as recited in claim 1 further including the step of minimizing power spectral sidelobe regrowth in the presence of distortion caused by RF circuits.

5. A communication system for transmitting and receiving an input data stream, said communication system comprising:
 a transmitter for receiving the input data stream and transmitting the input data stream out therefrom, said transmitter including a modulator defining a pulse shaping function p(t) for mapping the input data stream using phase shift keying to create a modulated signal, and an amplifier working in a saturation region and defining an impulse response function $p_1(t)$ for amplifying the modulated signal to create an amplified modulated signal, wherein said pulse shaping function and said impulse response function are convoluted such that the pulse shaping function and the impulse response function satisfy:

$$x(t = kT_s) = 1, \text{ if } k = L$$
$$= 0, \text{ Else}$$

where L is the number of symbols and $T_s$ is the symbol time;
 where x(t) is the convolution of g(t)=p(t)*p₁(t) and g(T−t), where T is the duration of g(t);
 a channel through which the amplified modulated signal is transmitted; and
 a receiver to receive the amplified modulated signal to down convert the amplified signal to retrieve the input data stream therefrom.

6. The communication system as recited in claim 5 wherein said transmitter includes an encoder to reduce distortion caused by said power amplifier and said channel.

7. The communication system as recited in claim 5, wherein said modulator constructs the modulated signal in orthogonal channels using first and second finite impulse response filters.

8. The communication system as recited in claim 7, wherein said first and second finite impulse response filters apply pulse shaping functions to the input data stream to create the modulated signal.

9. The communication system as recited in claim 8, wherein said modulator constructs the modulated signal of phase shift keying having a variable envelope in the orthogonal channels.

10. The communication system as recited in claim 9 wherein said receiver includes filters matched to said first and second finite impulse response filters in said transmitter.

11. The communication system as recited in claim 8, wherein said first and second finite impulse response filters define a square root raised cosine function having a roll-off factor (β) in a range between 0.6 and 1.0, inclusive.

12. The communication system as recited in claim 11 wherein said square root raised cosine function defines a duration of symbols (L) in the range between 2 and 6, inclusive.

13. The communication system as recited in claim 12 wherein said receiver includes correlators to correlate the amplified modulated signal in orthogonal channels with pre-stored waveforms or signals, said correlators create an output signal from the amplified modulated signal.

14. The communication system as recited in claim 13 wherein said receiver includes a signal detector to detect the input data stream from the output signal.

15. The communication system as recited in claim 14 including a parameter estimator to estimate carrier frequency, phase and symbol timing, using the output signal of said correlators.

16. The communication system as recited in claim 15 including a tracking loop which uses the carrier frequency, phase and symbol timing estimated by said parameter estimator to track the input data stream.

17. The communication system as recited in claim 16 wherein said receiver includes a decoder.

18. The communication system as recited in claim 17, wherein said decoder overcomes the distortion caused by said transmitter and said channel using a decoding algorithm is optimal to noise distribution.

19. The communication system as recited in claim 12, wherein said amplifier includes class-F, class-E, class-D, class-C amplifiers, and class-A, class-B, class-AB amplifiers working in the saturation region.

20. The communication system as recited in claim 5, comprising an antenna for transmission and reception of the amplified modulated signal.

21. The communication system as recited in claim 20 wherein said receiver includes a down-converter to convert the received signal to a baseband.

22. The communication system as recited in claim 21 wherein said receiver includes a sampling circuit to sample the amplified modulated signal.

23. The system as recited in claim 20 further comprising a demodulator to demodulate the amplified modulated signal in the presence of both distortion and noise, the demodulator comprising:
 a first down-converter to convert the received signal in the in-phase channel to baseband;
 a second down-converter to convert the received signal in the quadrature channel to baseband;
 a sampling circuit to sample the baseband signals in both the in-phase channel and the quadrature channel;
 an analog-to-digital converter to convert the sampled baseband signals to digital signals;
 a first finite impulse response filter matched to the shaping filter for the in-phase channel in the transmitter, the filter performs low-pass filtering for the samples in the in-phase channel;
 a second finite impulse response filter matched to the shaping filter for the quadrature channel in the transmitter, the filter performs low-pass filtering for the samples in the quadrature channel;
 a signal detector to detect the incoming signal using the matched filter output; a parameter estimator to estimate the symbol timing, carrier frequency offset and carrier phase using the matched filter output;
 a tracking loop to track the carrier frequency, carrier phase and the symbol timing; and
 a decoder to make decisions on the received symbols using the tracking loop output.

24. A transmitter for receiving an input data stream and transmitting the input data stream out therefrom, said transmitter comprising:
- a modulator defining a pulse shaping function p(t) for mapping the input data stream using phase shift keying to create a modulated signal, said modulator including first and second finite impulse response filters to construct the modulated signal in orthogonal channels, wherein said first and second finite impulse response filters define a roll-off factor ($\beta$) in a range between 0.6 and 1.0, inclusive, for a square root raised cosine function; and
- an amplifier defining an impulse response function $p_1(t)$ for amplifying the modulated signal to create an amplified modulated signal, wherein said pulse shaping function and said impulse response function are convoluted to minimize the effect of noise and distortion allowing the input data stream to be demodulated and read such that the pulse shaping function and the impulse response function satisfy:

$$x(t = kT_s) = 1, \text{ if } k = L$$
$$= 0, \text{ Else}$$

where L is the number of symbols and $T_s$ is the symbol time;
where x(t) is the convolution of $g(t)=p(t)*p_1(t)$ and $g(T-t)$, where T is the duration of $g(t)$.

25. A method for phase shift keying communications systems for use with nonlinear power amplifiers and linear power amplifiers working in saturation region to achieve bit error performance compatible to bit error rate of phase shift keying communications system using linear power amplifier, the method comprising of the steps of:
- generating a phase shift keying signal using square root raised cosine function with roll-off factor in a range between 0.6 and 1.0 as pulse shaping function p(t) to create a modulated signal;
- amplifying the modulated signal to create an amplified modulated signal by a nonlinear power amplifier or a linear power amplifier working in saturation region with impulse response function $p_1(t)$, the pulse shaping function and the impulse response function satisfying:

$$x(t = kT_s) = \begin{cases} 1 & \text{If } k = L \\ 0 & \text{Else} \end{cases}$$

where L is the number of symbols and $T_s$ is the symbol time; and
where the function x(t) is the convolution of $g(t)=p(t)*p_1(t)$ and $g(T-t)$, where T is the duration of $g(t)$;
- filtering the modulated amplified signal in the in-phase channel by a finite impulse response filter matched to the convolution of the said pulse shaping function and the said impulse response function;
- filtering the modulated amplified signal in the quadrature channel by a finite impulse response filter matched to the convolution of the said pulse shaping function and the said impulse response function; and
- using the output signals of the said finite impulse response filters to retrieve the information data stream.

* * * * *